United States Patent
Hyman et al.

(10) Patent No.: US 10,258,185 B2
(45) Date of Patent: Apr. 16, 2019

(54) COMBINATION CUP AND BREWER

(71) Applicants: Joseph M. Hyman, Baltimore, MD (US); Ezekiel Kolajo, Hanover, MD (US); Jingrui Wang, Cantonsville, MD (US); Alexandre Wing, Columbia, MD (US)

(72) Inventors: Joseph M. Hyman, Baltimore, MD (US); Ezekiel Kolajo, Hanover, MD (US); Jingrui Wang, Cantonsville, MD (US); Alexandre Wing, Columbia, MD (US)

( * ) Notice: Subject to any disclaimer, the term of this patent is extended or adjusted under 35 U.S.C. 154(b) by 0 days.

(21) Appl. No.: 14/881,227

(22) Filed: Oct. 13, 2015

(65) Prior Publication Data

US 2017/0099978 A1  Apr. 13, 2017

(51) Int. Cl.
*A47J 31/00* (2006.01)
*A47J 31/56* (2006.01)
*A47J 31/04* (2006.01)

(52) U.S. Cl.
CPC ............. *A47J 31/005* (2013.01); *A47J 31/04* (2013.01); *A47J 31/56* (2013.01)

(58) Field of Classification Search
CPC .......... A47J 31/02; A47J 31/20; A47J 31/545; A47J 36/027; A47J 31/005; A47G 19/16; B05C 17/06; B41N 1/245; B65D 2205/00; B65D 2581/3409; B65D 81/3453; B65D 85/8043; B65D 85/812; Y10S 430/165; Y10S 99/14
USPC ......... 99/280, 316, 323, 295, 306, 279, 281, 99/282, 296, 317, 318, 319, 320, 322; 426/433, 82, 234, 431, 435, 77; 220/592.16, 592.17, 915.1
See application file for complete search history.

(56) References Cited

U.S. PATENT DOCUMENTS

| 1,774,927 | A | * | 9/1930 | Lambert | A47J 31/306 99/303 |
|---|---|---|---|---|---|
| 2,732,787 | A | | 1/1956 | Osborne | |
| 3,181,951 | A | | 5/1965 | Gronvold | |

(Continued)

OTHER PUBLICATIONS

Mojoe Brewing Co., mojoe: The Personal Mobile Coffee Maker, INDIEGOGO web page, available at https://www.indiegogo.com/projects/mojoe-the-personal-mobile-coffee-maker#/story, published on the Internet in the U.S. more than 1 year prior to the present application.

*Primary Examiner* — Tu B Hoang
*Assistant Examiner* — Masahiko Muranami
(74) *Attorney, Agent, or Firm* — Louis Ventre, Jr.

(57) ABSTRACT

A system produces a brew from an infusible brew substance using a combination of a mug and a brewer housed within the mug. The mug includes a vessel inside the mug that holds the water used to brew the brew. The vessel has an exit port below its upper rim. A removable stopper closes the vessel. A siphon tube fits through the exit port and extends downward within the vessel to the siphon's suction end. A heating element is immersed in water within the vessel. When electrically energized, the heating element vaporizes the water, which rises to the top and pushes the water downward into the suction end. A mesh filter holds the infusible brew substance or the substance is placed in the bottom of the mug. The mesh filter is located below the siphon sticking out of the exit port. Water flows through the filter into the mug outside the vessel.

7 Claims, 2 Drawing Sheets

(56) References Cited

U.S. PATENT DOCUMENTS

| | | | | |
|---|---|---|---|---|
| 4,382,402 | A | * | 5/1983 | Alvarez ................ A47J 31/057 |
| | | | | 219/202 |
| 4,495,404 | A | * | 1/1985 | Carmichael ........... A47J 31/005 |
| | | | | 206/541 |
| 4,704,954 | A | * | 11/1987 | Mollenhoff ........... A47J 31/005 |
| | | | | 99/279 |
| 4,948,601 | A | | 8/1990 | Serbu |
| 4,977,820 | A | | 12/1990 | Lin |
| 4,980,539 | A | * | 12/1990 | Walton ................. A47J 36/2461 |
| | | | | 219/386 |
| 5,168,140 | A | | 12/1992 | Welker |
| 5,967,019 | A | | 10/1999 | Johnson et al. |
| 7,337,704 | B2 | | 3/2008 | Hammad et al. |
| 7,552,673 | B2 | * | 6/2009 | Levin ....................... A61J 9/00 |
| | | | | 426/433 |
| 7,958,816 | B2 | | 9/2011 | Lin |
| 8,584,576 | B2 | | 11/2013 | Fogg, IV |
| 2002/0096055 | A1 | * | 7/2002 | Heczko .................... A23L 2/00 |
| | | | | 99/323.3 |
| 2007/0169629 | A1 | * | 7/2007 | Shao ................... A47J 27/2105 |
| | | | | 99/275 |
| 2011/0072979 | A1 | * | 3/2011 | Fogg, IV .............. A47J 31/005 |
| | | | | 99/288 |
| 2013/0312617 | A1 | * | 11/2013 | Toporovsky .......... A47J 31/005 |
| | | | | 99/280 |

* cited by examiner

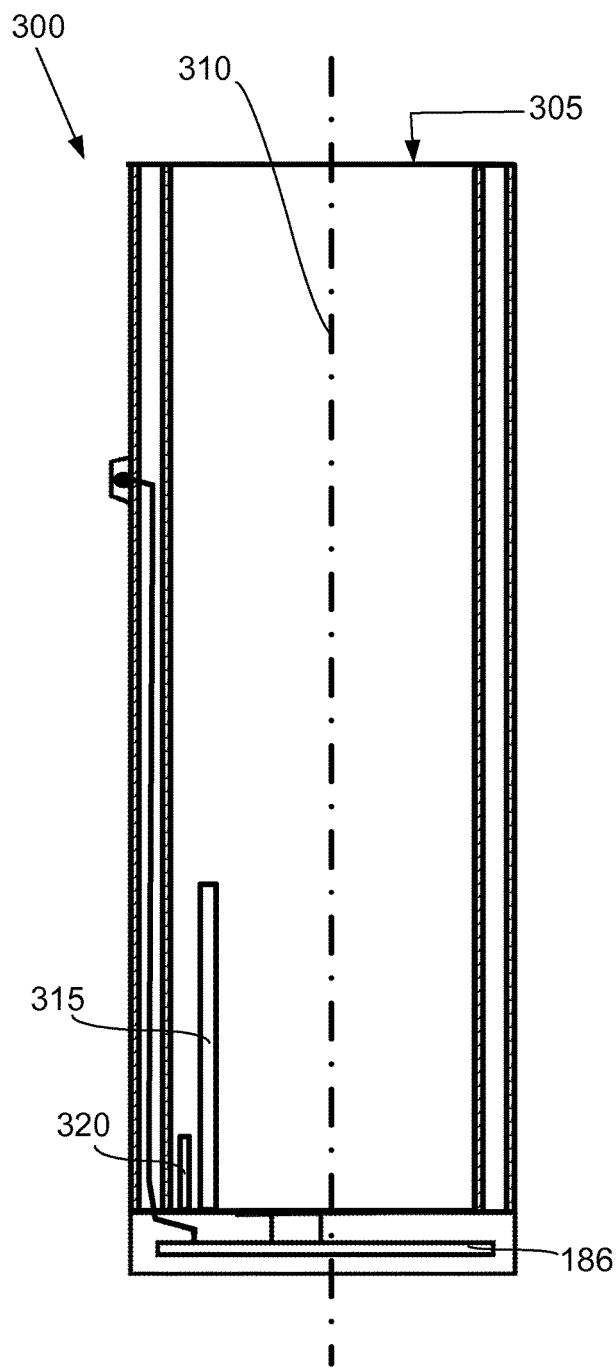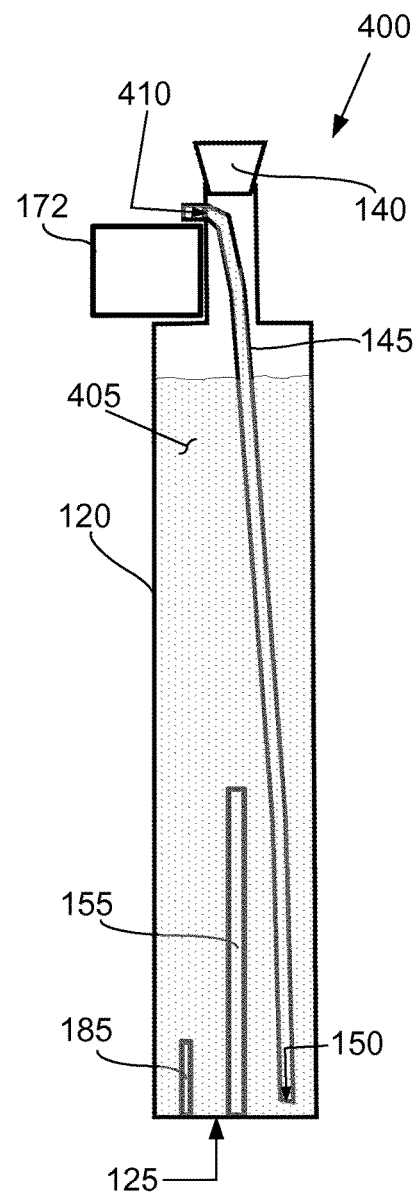
FIG.3
FIG.4

COMBINATION CUP AND BREWER

TECHNICAL FIELD

In the field of foods and beverages, a combination cup and brewer is adapted and designed for making a brew within the cup by subjecting an infusible brew substance to the action of heated water that is directed to flow through the infusible brew substance within the cup.

BACKGROUND ART

Single cup coffee, tea and hot chocolate brewing systems have become popular in recent times. These typically involve a physically large brewer device that heats a compartment filled with water and pumps a single cup's worth of heated water through a prepackaged container of the brew. A personal cup is placed below the exit, usually on a tray built into the device, so that the brew flows directly into the person's cup.

Other types of single cup brewers have been disclosed which typically involve holding a separate brewing device or sieve in or on a cup and either pouring hot water through it or subjecting it to microwave heating where the brew then drains into the cup. Some include using individual-service coffee bags with sufficient ground coffee or tea to make a single cup using heated water.

SUMMARY OF INVENTION

A system produces a beverage or food from an infusible brew substance, such as ground coffee, powdered soup or any number of other instant foods, using a combination of a mug and a brewer housed within the mug. The mug holds the brew while being carried in a person's hand.

The mug has a lid to prevent spillage and includes a vessel inside the mug that holds the water used to brew the infusible brew substance. The upper rim of the vessel is below the open top end of the mug and has an exit port below upper rim.

A removable stopper fits in the upper rim and seals the vessel closed. A siphon tube fits through the exit port of the vessel and extends downward within the vessel to a suction end near the bottom of the vessel.

A heating element within the vessel is immersed in water within the vessel. When electrically energized the heating element vaporizes the water, which rises to top and pushes the water downward into the suction end of the siphon tube. A heating element may also be outside the vessel and within the mug to maintain the temperature of the brew.

A mesh filter holds the infusible brew substance and is located below the exit port outside the vessel. The siphon tube sends water into the mesh filter, which allows the water to drip out into the mug in a volume outside the vessel. For foods and other brew substances, the substance is placed in the bottom of the mug and is immersed in hot water to brew.

A battery may be removably attached to the mug to supply electricity to the heating element within the vessel. If an optional heating element outside the vessel in the mug is present, then also to supply electricity to that heating element. A heat sensor within the vessel may be connected to the electricity source to control the heating element and temperature of the water. If the optional heating element is present outside the vessel in the mug, then there may also be a second heat sensor outside the vessel in the mug to regulate the temperature of the brew.

An optional power jack permits the device to be plugged into a wall outlet or car/cigarette lighter outlet. When present, the power jack is electrically connected to the heating element and printed circuit board by a conductor running within the wall of the mug.

A switch may be present to manually turn the heating element on and off. When present, the switch is electrically connected to the heating element and printed circuit board by a conductor running within the wall of the mug.

An LED signal light may be present to indicate whether or not the heating element is on or off. When present, the LED signal light is electrically connected to the heating element and printed circuit board by a conductor running within the wall of the mug.

Technical Problem

There is presently no portable, self-contained brewer and cup for any hot beverage or foods. People want a fresh cup of coffee, tea, or quick foods at odd times when they are on the go and do not have the time or inclination to wait for it. Today, they are mostly stuck wasting enormous amounts of time and money standing in line to purchase such items.

What is needed is a combination cup and brewer system that is centered around the busy person, providing a convenient way to add coffee ingredients ahead of the brew and cleanly store them for immediate use whenever the person is ready to brew.

Solution to Problem

The solution is a travel mug-sized portable brewer that allows a user to brew a personal cup of coffee, tea, or foods on-the-go using any temperature water from any source and with their own infusible brew substance (e.g., coffee, tea, powdered soup, or other instant food).

The solution is a non-motor driven brewing system that uses vapor pressure to push hot water through a siphon tube and into a mesh-filter where the water steeps through or submerses an infusible brew substance (e.g., coffee) where it is available for immediate from the mug. Once heat is removed, the motivating vapor pressure drops and brewing stops.

Advantageous Effects of Invention

The combination cup and brewer may be powered up anywhere using a rechargeable battery, car adapter, or a wall adapter. After the coffee is brewed, the person can immediately enjoy the brew directly from the combination cup and brewer.

A detachable rechargeable battery, e.g. a lithium battery, permits anytime use and brews a hot cup every time. If included, such a battery could be easily detached to reduce the weight and size of the mug.

The combination cup and brewer includes no motor of any kind or bulky equipment to move the water inside the mug. The absence of a motor eliminates the noise, weight, and size factor present in many single cup brewers.

BRIEF DESCRIPTION OF DRAWINGS

The drawings illustrate preferred embodiments of the combination cup and brewer according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

FIG. 3 is a sectional elevation view of the mug in FIG. 1.

FIG. 4 is a sectional elevation view of the brewer in FIG. 1.

DESCRIPTION OF EMBODIMENTS

Figures 1, 2:
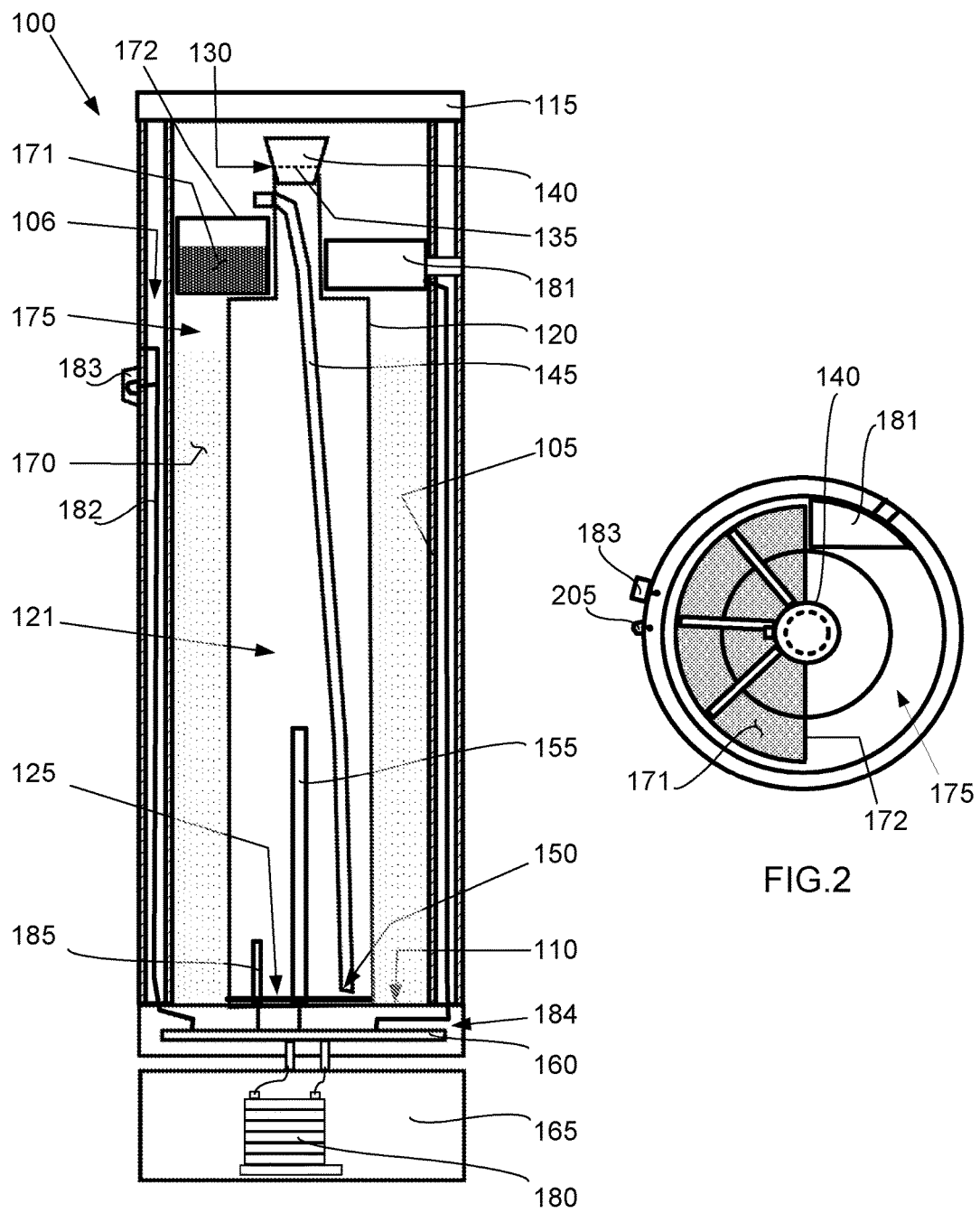
FIG. 1 is a sectional elevation view of a preferred embodiment of the combination cup and brewer.
FIG. 2 is a top view of the embodiment of FIG. 1.

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention.

FIG. 1 illustrates a preferred embodiment of a combination cup and brewer. The term "cup" is used herein synonymously with "mug," both of which are of the variety used by people to contain a beverage or food for consumption either at one place or on the go. In its broadest sense, the terms "mug" and "cup" may be a bowl so that instant food, such as soup, rice, noodles or steamed veggies, may be made and consumed with a spoon or other utensil.

The combination is a system (100) for producing a brew (170) from an infusible brew substance (171), such as for example coffee from ground coffee beans. Other common infusible brew substances are tea, hot chocolate, and powdered soup. In addition, other instant foods commonly made with hot water can be made up by producing hot water in the mug and then pouring that into a bowl with the instant food. For foods, like powdered soup and other brew substances, the brew substance may be added to mug (300) outside the vessel (120), to reside at the watertight bottom end (110) of the mug (300) so that it can be immersed in hot water to form the brew in the mug (300).

The system (100) includes a combination of a mug (300) and a brewer (400) housed within the mug (300).

The mug (300) is of a shape and size of a typical portable coffee mug or portable food container. The mug (300) is configured to hold the brew (170) while being carried in a person's hand. The mug (300) is preferably a right-circular cylindrical container that defines a central axis (310). The mug (300) may have any cross-sectional shape suitable for a drinking cup or food container and capable of holding the brewer (400) within, such as an octagon with a wider diameter at the bottom than at the top; or such as a bowl shape.

The mug (300) defines a watertight bottom end (110) and a wall (105) rising from the watertight bottom end (110) to an open top end (305). The wall (105), in combination with the watertight bottom end (110), is configured to contain the brew (170) within the mug (300).

The system (100) preferably includes a lid (115) for the mug (300). The lid (115) is configured to close the open top end (305) of the mug (300).

The brewer (400) is a combination of elements that make the brew (170) from the infusible brew substance (171). The brewer (400) includes a vessel (120); a removable stopper (140); a siphon tube (145); a heating element (155); and a mesh filter (172).

The vessel (120) is configured to define a reservoir (121) that can hold water (405) isolated from the volume within the mug (300) that is outside the vessel (120). A glass vial or a high-temperature plastic container are examples.

The vessel (120) rises from a lower extremity (125) above the watertight bottom end (110) of the mug (300) to a point (130) below the open top end (305) of the mug (300). The vessel (120) does not have to be attached to the watertight bottom end (110) of the mug (300) but may be glued or otherwise affixed thereto to promote stability of the vessel (120) within the mug (300). When the lower extremity (125) of the vessel (120) is too far above the watertight bottom end (110) of the mug (300) to be fixed to the watertight bottom end (110), then the vessel (120) may be stabilized by other means such as horizontal rods extending from the wall (105) or a fixture placed on the watertight bottom end (110) of the mug (300) that extends upward to engage or restrain the vessel (120).

The vessel (120) preferably defines an upper rim (135) below the open top end (305) of the mug (300) and an exit port (410) below upper rim (135).

The removable stopper (140) is a means to clean or gain access to the inside of the vessel (120), such as for example to add fresh water to the vessel (120). The removable stopper (140) is configured to mate with the upper rim (135) of the vessel (120) so as to impede the escape of steam from the vessel (120).

The removable stopper (140) is preferably a durable plastic stopper, but may be any suitable vessel closure. Preferably, the closure ensures that the vessel (120) is tight against excessive leakage of water vapor generated during the brewing process. For example, the stopper may have threads which cooperate with the upper rim (135) to ensure a durable seal that better resists opening due to operating pressure conditions. Alternatively, the stopper may have ridges that engage the upper rim (135) for a tight friction fit.

The siphon tube (145) fits through the exit port (410) of the vessel (120). The fit is preferably tight so that there is not an exit for water vapor generated during the brewing process. The siphon tube (145) extends downward from the exit port (410) within the vessel (120) to a suction end (150). The suction end (150) lies above the lower extremity (125) of the vessel (120). There is preferably sufficient room between the suction end (150) and the watertight bottom end (110) of the mug (300) to permit water (405) to be pushed up the siphon tube (145) as water (405) is vaporized by the heating element (155).

The heating element (155) extends into the vessel (120) and is configured to be immersed in water (405) within the vessel (120) so that when the heating element (155) is electrically energized, the heating element (155) vaporizes the water (405). The water vapor created by the heating element (155) rises toward the bottom of the removable stopper (140) so as to force the liquid water to flow down and then up and out of the siphon tube (145).

A second heating element (315) may be added within the mug (300) and outside the vessel (120) in order to offer the ability to heat the brew (170) or maintain a desired brew temperature. For this embodiment a second heat sensor (320) is preferably present within the mug (300) and outside the vessel (120). This second heat sensor (320) is also preferably connected to the printed circuit board (160) so that its settings may be altered by the user.

The electrical connection that energizes the heating element (155) extends through the lower extremity (125) of the vessel (120) and then extends through the watertight bottom end (110) of the mug (300). Preferably, the electrical connection thereafter connects up with an electricity source (165), preferably through a printed circuit board (160), which controls the flow of electricity and the heating process. The electricity source (165) is preferably a battery (180) that can be recharged, but may be any other type of electricity source, such as a capacitor.

The mesh filter (172) is preferably a water permeable container that is configured to hold the infusible brew substance (171). The mesh filter (172) is preferably a disposable infusible container that contains the ground coffee or other infusible brew substance (171) and prevents the ground coffee or other infusible brew substance (171) from spilling into the volume (175) of the mug (300) available for the brew (170). Alternatively, the mesh filter (172) is a porous container that can be opened to add fresh ground coffee and closed again to prevent spillage. The mesh filter (172) may be removable to facilitate its cleaning or to enable adding an infusible brew substance (171) to the watertight bottom end (110) of the mug (300). Preferably, the mesh filter (172) is made of a fine metal mesh having a re-closable cap. Preferably, the mesh filter (172) fills with a scoop of fresh ground coffee and then can be snapped closed within the mug (300) to cleanly store the mesh filter (172) until the moment brewing is desired.

The mesh filter (172) is preferably located below the exit port (410) outside the vessel (120). The mesh filter (172) is configured to receive outflow of water (405). For preferable embodiments, the mesh filter (172) allows the water (405) to easily enter the mesh filter (172) when it flows out of the siphon tube (145). For most embodiments, the mesh filter (172) is preferably configured to be located immediately below the exit port (410).

The mesh filter (172) is configured to permit the brew (170) to exit the mesh filter (172) into a volume (175) outside the vessel (120) and within the mug (300). The brew (170) can then be sipped by the user out of the open top end of the mug (300) as one would do with any other mug.

The system (100) may include a battery (180) attached to the mug (300), preferably removably attached, below the watertight bottom end (110), the battery (180) is configured to supply electricity to the heating element (155). Preferably, the battery is a rechargeable battery and one that has a high charge density (long life), such as a lithium battery.

The system (100) may include a heat sensor (185) within the vessel (120) that measures the temperature of the water (405). The heat sensor (185) is connected to the electricity source (165) and configured to control the heating element (155) and the temperature of the water (405). This control may be built into the heat sensor or may be accomplished though a printed circuit board (160) located in an electronics chase (184) below the watertight bottom end (110) of the mug (300).

The system (100) may include a power jack (181) configured to enable a user to connect the heating element (155) to an external source of electricity, such as a cigarette lighter car adapter or such as an alternating current wall socket, either directly or through a transformer. The power jack (181) is electrically connected to the heating element (155) by a conductor (182) running within the wall (105) of the mug (300). The conductor (182) may be embedded within the wall (105). Preferably, the wall (105) is hollow with insulation that defines a narrow passageway through it. Alternatively, the wall (105) may be a double wall with a wall passage (106).

The system (100) may include a switch (183) to manually turn the heating element (155) on and off. The switch (183) is electrically connected to the heating element (155) by a conductor (182) running within the wall (105) of the mug (300).

The system (100) may include a light emitting diode signal light (205), also known as an LED signal light. The light emitting diode signal light (205) is configured to indicate whether or not the heating element (155) is on or off. The light emitting diode signal light (205) is electrically connected to the heating element (155), either directly or through the printed circuit board (160). The electrical connection is preferably made using a conductor (182) running within the wall (105) of the mug (300).

EXAMPLE

A combination cup and brewer system in this example is constructed where the mug (300) is 3.0 inches in diameter at the watertight bottom end (110) and stands 9.1 inches tall. A center section along the height of the mug (300) is depressed inward to enable a better hand grip. In addition there is a rubber-like wrap around this center section to enhance grip-ability of the mug (300). The rubber-like wrap is available in colorful options.

In this example, the mug (300) includes a lid (115) that fits over the open top end (305) and has a diameter of 3.3 inches and is 1.3 inches tall. The total volume available for the brew (170) that is brewed is 9 ounces as is the total volume for the vessel (120) that holds the water. The combined total volume is 18 ounces.

In this example, the combination cup and brewer system is made of dishwasher safe components of 100% BPA-free plastic. A lips-ready, closable and spill-proof opening is built into the lid (115).

In this example, a battery (180) is included for attachment to the mug (300). A convenient attachment location for the battery (180) is to the bottom of the mug (300), that is, below the watertight bottom end (110). Such placement maintains a low center of gravity for the mug (300) and helps to keep the mug (300) in place when it is set down by a user. The battery (180) is detachable and rechargeable with a 15-volt rating. The battery (180) is capable of powering the heating element (155) to vaporize water and be controlled by a heat sensor (185) and printed circuit board (160) to maintain a liquid water temperature in the vessel (120) up to a selectable temperature of up to about 200 degrees Fahrenheit.

In this example, there is a one-button start/stop button accessible on the exterior surface of the mug (300). A printed circuit board (160) is included having a capability to enable the user to select a safe-start and auto shut-off.

In this example, a power jack (181) is built into the combination cup and brewer system to enable external powering of the unit and charging of the battery (180). The power jack (181) is conveniently located near the top of the mug (300) so that it can be utilized while the mug (300) is in a cup holder. The power jack (181) accepts a standard output plug end from an adapter for the cigarette lighter receptor in a car. The power jack (181) also accepts a standard output plug end from a power supply adaptor transformer plugged into an AC wall outlet.

In this example, the combination cup and brewer system includes a high-heat insulating wall construction. The vessel (120) provides a reservoir (121), which is a separate single-use water reservoir that is isolated from the volume (175) of the mug (300) where the brew (170) resides after being brewed.

In this example, the system is functional with a packaged and re-loaded disposable filter and also with a reusable detachable filter that can be filled by the user with a scoop of coffee.

In this example, the system is equipped with two LED notification lights (a green LED and a red LED) that signal whether the heating element (155) is either on, off, or hot The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the food and beverage industry.

What is claimed is:

1. A system for producing a brew from an infusible brew substance, the system comprising a combination of a mug and a brewer housed within the mug, the mug:
   defining a volume which contains the brew from a watertight bottom end to an open top end of the mug;
   comprising a lid which closes the open top end of the mug; and
   configured with a double side-wall defining a wall passage between an inner wall and an outer wall, the double side-wall extending circumferentially from the watertight bottom end to a position adjacent to the lid;

the brewer comprising:
   a vessel which is surrounded by said volume while isolating a supply of water within said volume of the mug,
      the vessel rising from a lower extremity above the watertight bottom end of the mug to a point below the open top end of the mug,
      the vessel defining an upper rim below the open top end of the mug and an exit port below the upper rim;
   a removable stopper which mates with the upper rim of the vessel so as to impede the escape of steam from the vessel;
   a siphon tube fitting through the exit port of the vessel while extending downward as a unitary piece within the vessel to a suction end above the lower extremity of the vessel;
   a heating element within the vessel which is immersible in water within the vessel; and
   a mesh filter situated outside the vessel which enables holding the infusible brew substance, the mesh filter further enables receipt of outflow of water from the siphon tube, the mesh filter permits the brew to exit the mesh filter into a portion of the volume that is outside the vessel and within the mug.

2. The system of claim 1, further comprising a battery attached to the mug, the battery supplying electricity to the heating element.

3. The system of claim 1, further comprising a heat sensor within the vessel, the heat sensor connected to the electricity source and controlling the heating element and a temperature of the water.

4. The system of claim 1, further comprising a power jack which enables a user to connect the heating element to an external source of electricity, the power jack electrically connected to the heating element by a conductor running within the wall passage.

5. The system of claim 1, further comprising a switch to manually turn the heating element on and off, the switch electrically connected to the heating element by a conductor running within the wall passage.

6. The system of claim 1, further comprising a light emitting diode signal light which indicates whether or not the heating element is on or off, the light emitting diode signal light electrically connected to the heating element by a conductor running within the wall passage.

7. The system of claim 1, further comprising: a heating element within the mug and outside the vessel; and a second heat sensor within the mug and outside the vessel.

* * * * *